W. L. SPELLACY.
NUT LOCK.
APPLICATION FILED DEC. 2, 1909.
996,892.
Patented July 4, 1911.
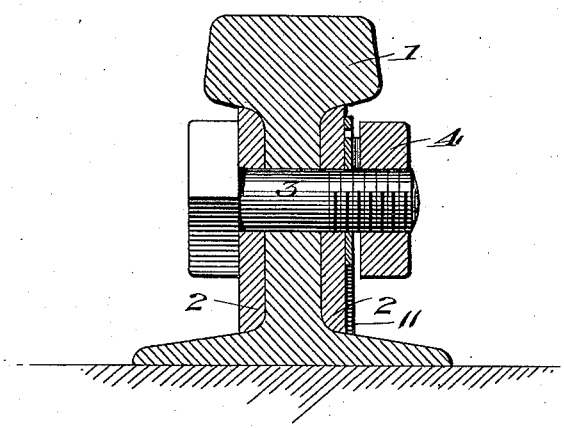
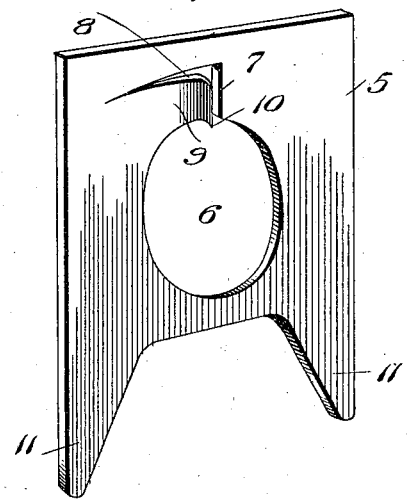
Inventor
William L. Spellacy
Witnesses
By
Attorney

UNITED STATES PATENT OFFICE.

WILLIAM L. SPELLACY, OF CLEVELAND, OHIO.

NUT-LOCK.

996,892.

Specification of Letters Patent.

Patented July 4, 1911.

Application filed December 2, 1909. Serial No. 530,911.

*To all whom it may concern:*

Be it known that I, WILLIAM L. SPELLACY, a citizen of the United States, residing at Cleveland, in the county of Cuyahoga and State of Ohio, have invented certain new and useful Improvements in Nut-Locks, of which the following is a specification.

This invention relates to nut locks designed more particularly for use in preventing the nuts from loosening on the bolts for securing together the meeting ends of railway rails, but capable of general use as a nut lock, and one of the principal objects of the invention is to provide a nut lock of simple construction, which will effectively prevent the nut from turning on the bolt and which will permit the readjustment of the nut whenever required.

Another object of the invention is to provide a nut lock comprising a somewhat rectangular plate of steel having a spring tongue bent therefrom, said tongue having a sharpened edge to bite into the inner face of the nut, to prevent its withdrawal from the bolt, said plate having sustaining legs designed to bear upon the upper surface of the base flange of the rail to prevent the plate from turning, said legs being adapted to be bent slightly outward whenever it is desired to readjust the nut upon the bolt.

It is sometimes found desirable to remove the nut from the bolt, and nut locks as a rule do not provide for this readjustment.

My invention provides for a quick readjustment of the nut without destroying the efficiency of the nut lock whenever it is again required.

The objects and advantages above referred to may be attained by means of the construction illustrated in the accompanying drawing, in which,—

Figure 1 is a vertical sectional view taken through the railway rail, the fish plates at the sides of the rail, the nut lock and the nut, the bolt being shown in side view. Fig. 2 is an enlarged perspective view of the nut lock removed from the bolt.

Referring to the drawing the numeral 1 designates a railway rail of the usual construction; 2 are the fish plates, also of the usual or any preferred type.

The plate 3 and the nut 4 may be of the common or usual form.

This bolt lock comprises a sheet steel plate 5 of substantially rectangular form provided with a bolt opening 6 extending through the plate. Cut from the body of the plate by means of a slit 7, extending from the bolt holes 6 upward, and a curved slit 8 extending from the slit 7 outward, is a spring tongue 9, said tongue being bent outward from the plane of the plate and provided with a sharpened cutting edge 10 designed to bite into the inner face of the nut 4 to prevent the nut from turning upon the bolt. The usual form of nut is made of substantially soft iron and the steel edge 10 will bite into the metal to prevent the nut from backward movement.

Extending downward from the plate 5 are supporting legs 11 at opposite sides of the plate. These supporting legs rest upon the top of the base flange of the rail to prevent the plate from turning in use; said legs, however, may bear against any projecting portion with which a nut lock is designed to be used. Whenever it is desired to readjust the nut 4 upon the bolt 3 or to loosen the nut on the bolt, the legs 11 may be bent outward from the fish plate, by means of a cold chisel, or similar tool, thus permitting the plate 5 to be revolved with the nut 4 in loosening from the bolt. Whenever it is desired again for use the legs 11 can be straightened out and the nut lock is again in condition for use.

From the foregoing it will be obvious that a nut lock made in accordance with my invention is simple in construction, can be used with any form of bolt and nut, will hold the nut firmly in adjusted position, will permit the nut to be removed from the bolt and readjusted without destroying the nut lock.

Having thus fully described the invention what is claimed as new is:

The herein described nut lock made from a flat rectangular sheet steel plate having a bolt hole therein, sustaining legs extending down from opposite sides of the bottom of the plate to rest upon a supporting surface and to assist in preventing the plate from turning during the adjustment of the nut, said legs being adapted to be bent outward for readjustment of the nut, a spring tongue cut from the body of the plate by means of a curved slit extending from the slot outward toward the edge of the plate, said spring tongue having a sharpened edge bent out from the plane of the plate to engage and bite into the plane face of an ordinary nut.

In testimony whereof I affix my signature in presence of two witnesses.

WILLIAM L. SPELLACY.

Witnesses:
N. G. VANDER WYST,
C. E. PERKINS.

Copies of this patent may be obtained for five cents each, by addressing the "Commissioner of Patents, Washington, D. C."